(12) United States Patent
Belsare et al.

(10) Patent No.: US 12,219,440 B2
(45) Date of Patent: Feb. 4, 2025

(54) SIGNALING OPTIMIZATION FOR LOCATION-BASED USER PLANE SERVICES

(71) Applicant: Cisco Technology, Inc., San Jose, CA (US)

(72) Inventors: Suyog Subhash Belsare, Maharashtra (IN); Pravin Appaji Ajagekar, Pune (IN); Ravi Shankar Mantha, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 377 days.

(21) Appl. No.: 17/868,326

(22) Filed: Jul. 19, 2022

(65) Prior Publication Data

US 2024/0031781 A1    Jan. 25, 2024

(51) Int. Cl.
*H04W 4/20* (2018.01)
*H04W 28/06* (2009.01)
*H04W 80/02* (2009.01)

(52) U.S. Cl.
CPC .......... *H04W 4/203* (2013.01); *H04W 28/06* (2013.01); *H04W 80/02* (2013.01)

(58) Field of Classification Search
CPC ..... H04W 4/203; H04W 28/06; H04W 80/02; H04W 76/12
See application file for complete search history.

(56) References Cited

U.S. PATENT DOCUMENTS

| | | |
|---|---|---|
| 2010/0039993 A1 | 2/2010 | Ramankutty et al. |
| 2012/0239966 A1 | 9/2012 | Kompella et al. |
| 2018/0302943 A1 | 10/2018 | Wang et al. |
| 2019/0021034 A1 | 1/2019 | Kim et al. |
| 2021/0029608 A1* | 1/2021 | Dodd-Noble ..... H04W 36/0066 |
| 2021/0029617 A1 | 1/2021 | Albasheir et al. |
| 2021/0337611 A1* | 10/2021 | Dodd-Noble ......... H04W 8/065 |
| 2022/0141718 A1* | 5/2022 | Shekhar ................ H04W 36/12 370/331 |

OTHER PUBLICATIONS

Agarwal et al; A Journey Towards a Converged 5G Architecture & Beyond, 2021 (Year: 2021).*

\* cited by examiner

*Primary Examiner* — Tejis Daya
(74) *Attorney, Agent, or Firm* — Polsinelli P.C.

(57) ABSTRACT

The present disclosure is directed to systems and techniques for improved signaling of subscriber information and updates thereto for one or more location-based user plane services. In one examples, the systems and techniques can include determining the existence of a converged User Plane Function (UPF) comprising a Serving Gateway User Plane (SGW-U) session and a Packet Data Network (PDN) Gateway User Plane (PGW-U) session. In response to determining the existence of the converged UPF, User Equipment (UE) information can be transmitted from a Serving Gateway Control Plane (SGW-C) session to the SGW-U session of the converged UPF. The UE information received at the SGW-U session can be shared to the PGW-U session of the converged UPF, wherein the PGW-U session receives the UE information without communicating with a PDN Gateway Control Plane (PGW-C) session.

20 Claims, 6 Drawing Sheets

SIGNALING OPTIMIZATION FOR LOCATION-BASED USER PLANE SERVICES

TECHNICAL FIELD

The present technology pertains to wireless networks, and more particularly to providing location-based user plane services in a packet data network (PDN).

BACKGROUND

A packet data network gateway (PGW) is a network function that can be used to provide an interface between a first packet data network (PDN) and one or more additional PDNs. A given PDN may include one or more PGWs that are used to provide an interface between the given PDN and external PDNs. For example, a 4G/LTE mobile core network (e.g., evolved packet core (EPC)) can include one or more PGWs as an interface between the 4G/LTE network and an external PDN, such as the Internet. Control and user plane separation can be applied to a PDN and/or a PGW, in which case a PGW-U serves as the user data plane ingress and egress point to the EPC and a PGW-C serves to manage control plane signaling and functionality. When a subscriber establishes an Evolved Packet System (EPS) bearer to a given PDN, the PGW-U under control of the PGW-C can serve as the point of attachment to that PDN for the life of the EPS bearer. In some examples, packet inspection may be an important role of the PGW-U, for example to ensure that data has the appropriate service level applied.

A PGW-U can be used to implement or otherwise provide one or more location-based services to the PDN with which the PGW-U is associated. For example, location-based services provided by the PGW-U can include Event Data Record (EDR) services, Traffic Optimization (TO) services, etc. EDR and TO information and/or services can be used to perform analytics, monetization, optimization, etc. Location-based services provided on the user plane (e.g., provided by the PGW-U) may be based on or otherwise utilize subscriber information. In some cases, location-based PGW-U services may require current or up-to-date information about a subscriber, as such subscriber information can change over time.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1A:
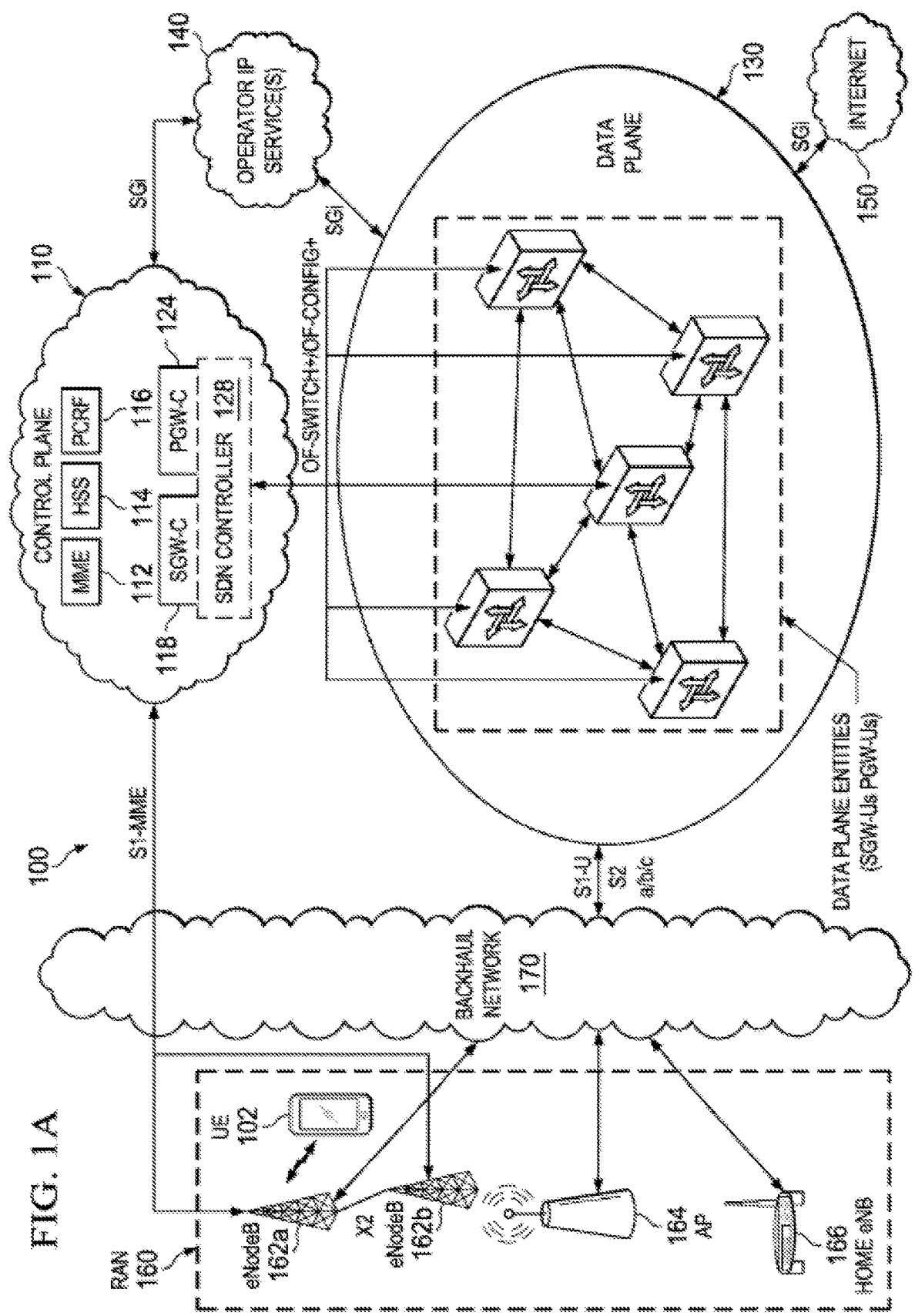
FIG. 1A illustrates a simplified block diagram of an example split control and user plane architecture, in accordance with some embodiments of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Aspects of the present disclosure are directed to providing location-based user plane services in a packet data network (PDN).

A method can include determining the existence of a converged User Plane Function (UPF), wherein the converged UPF includes a Serving Gateway User Plane (SGW-U) session and a Packet Data Network (PDN) Gateway User Plane (PGW-U) session; and in response to determining the existence of the converged UPF: transmitting User Equipment (UE) information from a Serving Gateway Control Plane (SGW-C) session to the SGW-U session of the converged UPF; and sharing the UE information received at the SGW-U session of the converged UPF to the PGW-U session of the converged UPF, wherein the PGW-U session receives the UE information without communicating with a PDN Gateway Control Plane (PGW-C) session.

In some embodiments of the method, determining the existence of the converged UPF comprises determining the existence of a Collapsed Call on User Plane session, wherein the Collapsed Call on User Plane session includes the SGW-U session and the PGW-U session.

In some embodiments of the method, the collapsed user plane session and the converged UPF are the same.

In some embodiments of the method, determining the existence of the converged UPF is based on receiving, at the SGW-C, a message indicating that the SGW-U is included in a collapsed user plane session.

In some embodiments of the method, the message indicating that the SGW-U is included in the collapsed user plane session is transmitted by the SGW-U in response to receiving an Sx Mod message from the SGW-C.

In some embodiments of the method, the Sx Mod message includes an updated eNodeB Tunnel Endpoint Identifier (TEID); and the Sx Mod message includes the UE information, wherein the UE information is piggybacked on the updated eNodeB TEID.

In some embodiments of the method, sharing the UE information to the PGW-U comprises providing the UE information received at the SGW-U session of the converged UPF to one or more PGW-U location-based services.

In some embodiments of the method, the one or more PGW-U location-based services include an Event Data Record (EDR) service or a Traffic Optimization (TO) service.

In some embodiments of the method, the UE information includes one or more of User Location Information (ULI) and UE Time Zone (TZ) information.

In some embodiments of the method, the UE information includes an update to a User Location Information (ULI) associated with a given subscriber or an updated to a UE Time Zone (TZ) information associated with the given subscriber.

A system can include one or more processors and at least one computer-readable storage medium having instructions stored thereon, wherein the instructions, when executed by the one or more processors, are effective to cause the one or more processors to: determine the existence of a converged User Plane Function (UPF), wherein the converged UPF includes a Serving Gateway User Plane (SGW-U) session and a Packet Data Network (PDN) Gateway User Plane (PGW-U) session; and in response to determining the existence of the converged UPF: transmit User Equipment (UE) information from a Serving Gateway Control Plane (SGW-C) session to the SGW-U session of the converged UPF; and share the UE information received at the SGW-U session of the converged UPF to the PGW-U session of the converged UPF, wherein the PGW-U session receives the UE information without communicating with a PDN Gateway Control Plane (PGW-C) session.

A non-transitory computer-readable storage medium can include instructions stored thereon, wherein the instructions, when executed by a processor, are effective to cause the processor to: determine the existence of a converged User Plane Function (UPF), wherein the converged UPF includes a Serving Gateway User Plane (SGW-U) session and a Packet Data Network (PDN) Gateway User Plane (PGW-U) session; and in response to determining the existence of the converged UPF: transmit User Equipment (UE) information from a Serving Gateway Control Plane (SGW-C) session to the SGW-U session of the converged UPF; and share the UE information received at the SGW-U session of the converged UPF to the PGW-U session of the converged UPF, wherein the PGW-U session receives the UE information without communicating with a PDN Gateway Control Plane (PGW-C) session.

EXAMPLE EMBODIMENTS

A packet data network gateway (PGW) is a network function that can be used to provide an interface between a first packet data network (PDN) and one or more additional PDNs. A given PDN may include one or more PGWs that are used to provide an interface between the given PDN and external PDNs. For example, a 4G/LTE mobile core network (e.g., evolved packet core (EPC)) can include one or more PGWs as an interface between the 4G/LTE network and an external PDN (e.g., such as the Internet or Session Initiation Protocol (SIP)-based IP Multimedia Subsystem (IMS) networks, among others).

A PGW can include control plane functions and user plane functions. In some aspects, the PGW control plane functions may be separated or otherwise decoupled from the PGW user plane functions. For example, control plane functions can be performed by a PGW-C and user plane functions can be performed by a PGW-U. In some examples, a Control and User Plane Separation (CUPS) approach can be used to decouple PGW control and user plane functions, allowing the data forwarding component (e.g., PGW-U) to be decentralized. This can allow tasks such as packet processing, traffic aggregation, etc., to be performed nearer to the network edge, and may increase bandwidth efficiencies while reducing network congestion. PGWs that are used to handle signaling traffic (e.g., PGW-Cs) can remain in the network core.

In some cases, when control and user plane separation is in place, a PGW-U serves as the user data plane ingress and egress point to the EPC. When a subscriber establishes an Evolved Packet System (EPS) bearer to a given PDN, the PGW-U under control of the PGW-C can serve as the point of attachment to that PDN for the life of the EPS bearer. In some examples, packet inspection may be an important role of the PGW-U, for example to ensure that data has the appropriate service level applied.

The PGW-U can be used to implement or otherwise provide one or more location-based services to the PDN with which the PGW-U is associated (e.g., included). For example, location-based services provided by the PGW-U can include Event Data Record (EDR) services, Traffic Optimization (TO) services, etc. EDR and TO information and/or services can be used to perform analytics, monetization, optimization, etc.

Location-based services provided on the user plane (e.g., provided by the PGW-U) may be based on or otherwise utilize subscriber information. In some cases, location-based PGW-U services may require current or up-to-date information about a subscriber, as such subscriber information can change over time. In some aspects, existing approaches to ensure that EDR, TO, and other such PGW-U location-based services include or are able to access the latest information about a subscriber are seen to be inefficient and cause increased signaling overhead (e.g., increased signaling) and/or latency in message processing on various interfaces (e.g., S5/S8, SXb, Gy/Gz, etc.)

Therefore, there exists a need for systems and techniques to provide optimized user plane signaling for location-based services on the user plane, including PGW-U location-based services such as EDR and TO, among others. For example, there is a need to reduce signaling overhead and/or the total volume of signaling messages exchanged in order to propagate updated or most current subscriber information to PGW-U location-based services. There is also a need to reduce latency in message processing on the various interfaces that may be associated with implementing subscriber information updates and/or location-based services for the PGW-U.

The present technology includes systems, methods, and computer-readable media (also referred to as "systems and techniques") for solving these problems and discrepancies.

In existing Evolved Packet Core (EPC) architectures, such as those specified by the 3$^{rd}$ Generation Partnership Project (3GPP), Serving Gateways (SGWs) are data plane elements that can route and forward user data packets, while also acting as a mobility anchor for the user plane during inter-eNodeB handovers. SGWs can additionally, or alternatively, act as an anchor for mobility between LTE and other 3GPP technologies. As discussed previously, Packet Data Network (PDN) Gateways (PGWs) may provide UE IP-connectivity access network (IP-CAN) session connectivity to one or more external packet data networks (PDNs), such as, for example, the Internet. The PGW can also serve as a policy enforcement point to manage Quality of Service (QoS), online/offline flow-based charging, data generation, deep-packet inspection, and/or lawful intercept, etc.

As mentioned previously, the EPC architecture can be implemented as a split architecture with control plane and user plane separation, for example based on a Control and User Plane Separation (CUPS) approach for decoupling PGW control and user plane functions. A control plane and user plane split architecture for the EPC can provide for a centralized control plane that can be hosted in a data center and a distributed data plane that can be hosted closer to Radio Access Network (RAN) nodes such as, for example evolved Node Bs (eNodeBs). By locating the data path/user plane (U-plane) forwarding elements closer to RAN nodes, lower latency of communication can be achieved. In some cases, by locating the data path routers closer to the RAN nodes (e.g., eNodeBs), a U-plane Serving Gateway (SGW) entity can potentially be removed from the data path and eNodeBs can directly route packet to a nearest Packet Data Network (PDN) Gateway (PGW) U-plane entity.

As referred to herein, a PGW U-plane entity, which can manage U-plane data traffic, can be referred to interchangeably as a 'PGWU' or a 'PGW-U.' Similarly, a PGW control plane (C-plane) entity, which can manage control plane traffic for a corresponding PGW-U, can be referred to interchangeably as a 'PGWC' or a 'PGW-C.' An SGW user plane entity, which can manage user plane data traffic, can be referred to interchangeably as an 'SGWU' or an 'SGW-U.' Likewise, an SGW control plane entity, which can manage control plane traffic for a corresponding SGW-U, can be referred to interchangeably as an 'SGWC' or an 'SGW-C.'

An example control plane 110 and user data plane 130 split architecture 100 for a communication system is described with reference to FIGS. 1A-1B. Referring to FIG. 1A, FIG. 1A is a simplified block diagram illustrating architecture 100. In some cases, architecture 100 is a split control and user plane EPC architecture. Control plane 110 can include one or more control plane entities such as a Mobility Management Entity (MME) 112, a Home Subscriber Server (HSS) 114, a Policy and Charging Rules Function (PCRF) 116, an SGW-C 118 and a PGW-C 124. In some embodiments, an SDN controller 128 can be provided in the control plane 110 to install and manage flows, routing, etc. across data plane entities (e.g., SGW-Us, PGW-Us) deployed in the user data plane 130. The SDN controller 128 can have a full topology view of the entire network and therefore may make decisions on optimal resource allocation in the data plane. In some cases, SDN controller 128 can be removed from the control plane, in which case SGW-C 118 and/or PGW-C 124 can perform SDN controller functions as needed.

In some embodiments, the control plane entities of the control plane 110 can be located in a data center or cloud deployment. Switching entities (e.g., SGW-Us, PGW-Us) can be distributed throughout user data plane 130, which can interface with nodes associated with a RAN 160. Nodes associated with RAN 160 can include one or more eNodeBs 162a-162b, one or more wireless (e.g., WiFi) access point(s) (AP(s)) 164 and/or one or more small cell radio(s) (e.g., Home eNodeB(s) 166). The interface with nodes of RAN 160 can be performed via a backhaul network 170. Each data plane entity (e.g., data plane routing/switching entity) can serve a set of one or more eNodeBs (e.g., locality specific). For example, in some embodiments, the control plane entities could be housed in a regional data center including a number of interconnected servers, while the data plane routing/switching entities can be housed in servers/sites closer to the RAN nodes. In some examples, architecture 100 can reduce the data path latency by routing packets through a closest router to the RAN 160, where a UE is connected to a node of the RAN 160. A user equipment (UE) 102 is also shown in FIG. 1A connected to eNodeB 162a.

In a virtualized control plane architecture, the MME 112, SGW-C 118 and PGW-C 124 may all be operating within a same data center. In such scenarios, the functions of two or more these network elements can be combined into a virtualized network function (VNF) or virtual machine (VM), referred to herein as a 'mobility controller'. In such a scenario, the messaging between the MME 112, the SGW-C 118 and/or the PGW-C 124 can be internalized and the flow installation at the SGW-U/PGW-U (e.g., either through the SDN controller or directly) can be performed by the combined VNF or VM.

RAN 160 can provide a communications interface between UE 102 and the control and user plane entities, operator IP service(s) 140 and/or internet 150 for one or more 3GPP and/or non-3GPP Internet protocol (IP) access networks. 3GPP access networks can include Global System for Mobile Communications (GSM) Enhanced Data Rates for GSM (EDGE) radio access network (GERAN), a Universal Mobile Telecommunications System (UMTS) Terrestrial radio access network (UTRAN), generally referred to as 3G, and/or a LTE access network such as evolved UTRAN (E-UTRAN), generally referred to as 4G or LTE/LTE-Advanced (LTE-A). 3GPP access networks can additionally, or alternatively, include a fifth-generation (5G) network. Non-3GPP IP access networks can include wireless local access networks (WLANs) such as WiFi, Worldwide Interoperability for Microwave Access (WiMAX), Bluetooth™ or the like.

eNodeBs 162a-162b can offer suitable connectivity to one or more UEs (e.g., UE 102) using any appropriate protocol or technique. eNodeBs 162a-162b can represent radio access point devices that can allow UEs to connect to a wired network using 4G/LTE/LTE-A/5G or any other appropriate standard. In some examples, a home eNodeB (HeNB) 166 can offer suitable connectivity to one or more UEs using any appropriate protocol or technique. HeNB 165 can represent a radio access point device that can allow UEs to connect to a wired network using 4G/LTE/LTE-A/5G or any other appropriate standard. An HeNB can sometimes be referred to as a small cell radio, small cell radio access point, a femtocell, a picocell, etc. In general, a small cell radio operates at lower power compared to a macro cell radio such as, for example, an eNodeB. Small cell radios are typically deployed in environments in which macro cell coverage is limited (e.g., in a building, etc.) and/or where user density is increased beyond the capabilities of one or more surrounding macro cell radios. Thus, small cell radios can offer connectivity to proximate users. A wireless access point (AP) 164 can offer suitable connectivity to one or more UEs using any appropriate wireless protocol or technique, such as for example, WiFi and the like.

A user or subscriber can be associated with the operation of a corresponding UE for one or more voice and/or data sessions. A subscriber associated with a given UE (e.g., UE 102) can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

UE 102 can be associated with any users, subscribers, employees, clients, customers, etc., wishing to initiate a flow in architecture 100 (e.g., via a wireless communications network such as a 4G network, a 5G network, etc.). The terms 'user equipment', 'mobile node', 'end user', 'user', and 'subscriber' can include various devices used to initiate a communication, such as a computer, a personal digital assistant (PDA), a laptop or electronic notebook, a cellular telephone, a smartphone, a tab, an IP phone, a tablet computer, or other device, component, element, or object capable of initiating voice, audio, video, media, or data exchanges within architecture 100. UE 102 can include one or more interfaces to a human user, such as a microphone, a display, a keyboard, or other terminal equipment. UE 102 may also be any device that seeks to initiate a communication on behalf of another entity or element such as a program, a database, or any other component, device, element, or object capable of initiating an exchange within architecture 100. In some cases, UE 102 may include or be associated with subscription for network access and application services (e.g., voice), etc. Once the access session is established, the user can register for application services as well, without additional authentication requirements. Within architecture 100, IP addresses (e.g., for UE 102 and/or for one or more other elements included in architecture 100) can be assigned using dynamic host configuration protocol (DHCP), Stateless Address Auto-configuration (SLAAC), etc., during default bearer activation processes, etc., or any suitable variation thereof. IP addresses used within architecture 100 can include IP version 4 (IPv4) and/or IP version 6 (IPv6) IP addresses.

MME 112 can be implemented as the primary control element for the EPC. For example, MME 112 can provide for UE tracking and paging procedures including, for example, retransmissions, tracking area list management, idle mode UE tracking, etc. For example, the MME 112 can maintain tracking information for UE 102 regarding previous and current information for UE transitions between or within Radio Access Networks (RANs). The MME 112 may further provide for UE bearer procedures including activation, deactivation and modification, among others. A Radio Access Bearer (RAB) or, more generally, a 'bearer' can refer to a path, channel, tunnel or the like through which communications can be exchanged between two endpoints for a particular service, application, etc. Typically, bearers are referred to in association with communications exchanged between a UE and one or more nodes of the EPC.

In some examples, a default bearer is established upon initial attachment of the UE 102 to a given RAN node (e.g., a given node of the RAN 160). In some examples, one or more dedicated bearers can be established for a given UE for one or more specialized services or applications provided to the UE such as, for example, a Voice over LTE (VoLTE) session, a data session, a Voice over IP (VoIP) session, a gaming session, combinations thereof or the like. A bearer for a given UE can be associated with one or more (or all) of the following at the EPC: 1) an IP address for the UE, which can be allocated from a pool of IP addresses via DHCP, SLAAC, etc.; 2) an IP address for an EPC node for a given PDN connection; and 3) a general packet radio service (GPRS) Tunnelling Protocol User Plane (GTP-U) tunnel from a PGW to a SGW and a GTP-U tunnel from the SGW to the eNodeB to which the UE is connected (e.g., if the UE is in a CONNECTED mode or state). A bearer can be identified using an EPS Bearer Identity (EBI).

The HSS 114 may offer a subscriber database in 3GPP (e.g., GSM, LTE, etc.) environments. In some aspects, the HSS 114 can provide functions similar to those offered by an Authentication, Authorization and Accounting (AAA) element server, which can provide functions including, but not limited to, UE authentication, authorization and accounting services. For example, when a UE (e.g., UE 102) moves to 3GPP access, the HSS 114 can be aware of this location and the UE's PDN anchor point (e.g., the corresponding PGW-U). HSS 114 and PCRF 116 can coordinate state information for the UE 102 (and synchronize this information) to provide mobility within the architecture 100. PCRF 116 may decide policy control and/or charging activities to apply to UE 102 based on various Policy Charging and Control (PCC) rules. PCRF 116 can be configured to use user subscription information as a basis for the policy and charging control decisions. The subscription information may apply for both session-based and non-session based services. PCRF 116 may be referred to generally as a policy server. Additionally, PCRF 116 may determine PCC rules based on an application or service described to the PCRF from an application function (AF). The AF may describe applications/services to PCRF 116 that may require dynamic policy and/or charging control for one or more UEs.

In some examples, data path switching entities (e.g., SGW-Us, PGW-Us) can be OpenFlow™ (OF) capable switching entities, denoted herein as 'OF-SWITCH+', capable of OF configuration, denoted herein as 'OE-CONFIG+', via SDN controller 128 or SGW-C 118 and PGW-C 124 (e.g., if no SDN controller is deployed). OpenFlow™ is a protocol defined by the Open Networking Foundation (ONF) that provides an interface between control plane entities and user data plane entities for programming flows (e.g., using IP addresses, tunnel endpoints, ports, etc.) for SDN architectures.

Control plane entities and user plane entities can interface with various operator IP service(s) 140. The operator IP service(s) 140 can include an IP multimedia subsystem (IMS) that provides VoLTE capabilities for UEs (e.g., UE 102). The control plane entities can further interface with Internet 150. In some aspects, architecture 100 may implement user datagram protocol/internet protocol (UDP/IP) connections and/or transmission control protocol/internet protocol (TCP/IP) connections. Architecture 100 can additionally, or alternatively, implement any other suitable communication protocol for transmitting and receiving packets. In some cases, operator IP service(s) 140, backhaul network 170 and internet 150 can be provided as multiple networks interconnected via one or more network appliances, elements, gateways, etc. In some aspects, operator IP service(s) 140 and backhaul network 170 may overlap with and/or be included within internet 150.

In some aspects, control plane entities of control plane 110 and data plane entities of data plane 130 can collectively be referred to herein as a "core network'" or an "EPC". Backhaul network 170 may provide infrastructure to provide at least one differentiated, secure, reliable and manageable communication channel, which facilitates interconnections between one or more nodes of RAN 160, one or more data plane entities of data plane 130 and one or more control plane entities of control plane 110. The aforementioned infrastructure can include, but is not limited to, one or more network elements such as routers, switches, gateways, etc.; one or more communication links (e.g., wired or wireless); one or more interfaces to facilitate user data and control plane exchanges according to one or more signaling protocols; and/or combinations thereof or the like.

Communications in a network environment can be referred to herein as "network traffic" or "traffic," which may be inclusive of packets. A packet is a formatted unit of data and can contain both control information (e.g., source and destination address, etc.) and data, which is also known as payload. In some cases, control information can be included in headers and trailers for packets. Network traffic can be sent and received according to any suitable communication messaging protocols. Suitable communication messaging protocols can include a multi-layered scheme such as the Open Systems Interconnection (OSI) Model, or any derivations or variants thereof. For example, architecture 100 may include a configuration capable of TCP/IP communications for the transmission or reception of packets in a network. Architecture 100 may also operate in conjunction with UDP/IP traffic or any other suitable protocol where appropriate and based on particular needs. Other protocols or interfaces that can be used in architecture 100 can include 3GPP DIAMETER-based protocols, remote authentication dial in user service (RADIUS) protocols, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc. The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets. As shown in FIG. 1A, an S1-MME interface, as defined in 3GPP standards, can be provided between eNodeBs 162a-162b and the control plane 110 (e.g., for interfacing with MME 112). An X2 interface, as defined in 3GPP standards, can be provided for interfacing between eNodeB 162a-162b. Additional interfaces, as defined in 3GPP standards, can include S1-U, S2a, S2b, S2c, etc. and can be provided between backhaul network 170 and the data plane 130 entities.

Figure 1B:
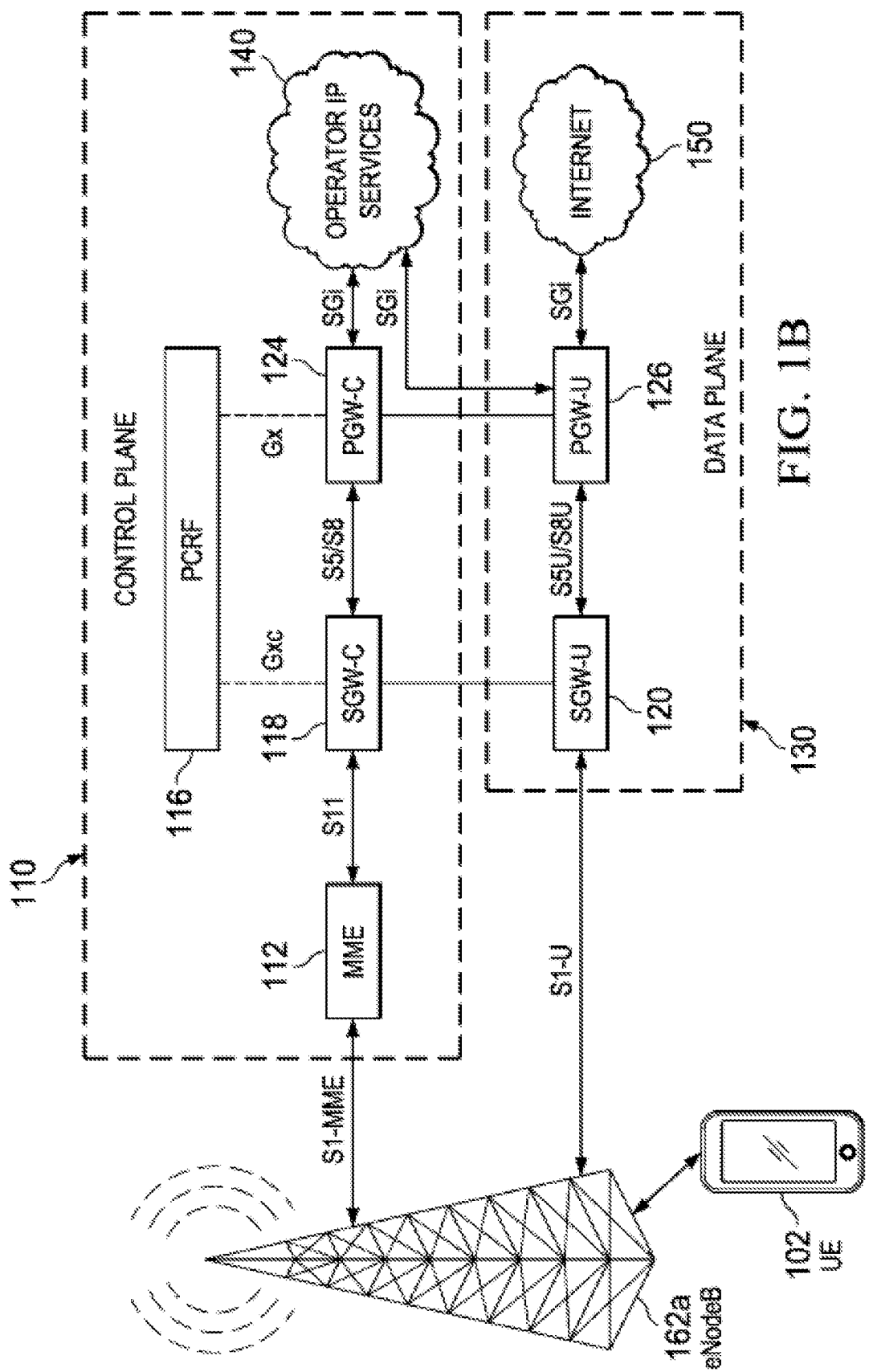
FIG. 1B illustrates a simplified block diagram of further details of an example split control and user plane architecture, in accordance with some embodiments of the present disclosure.

Referring to FIG. 1B, FIG. 1B is a simplified block diagram illustrating additional example details that can be associated with architecture 100 for the control plane 110 and data plane 130 split of EPC packet gateway nodes. FIG. 1B includes eNodeB 162a, MME 112, SGW-C 118 and SGW-U 120, PGW-C 124 and PGW-U 126, and PCRF 116. As illustrated, MME 112, PCRF 116, SGW-C 118 and PGW-C 124 may each be included in control plane 110, while SGW-U 120 and PGW-U 126 are included in data plane 130. In some embodiments, SGW-U and PGW-U sessions can be collapsed on the user plane—for example, for sessions supporting Collapsed Call on User Plane, the SGW-U and PGW-U sessions can be collapsed into a converged User Plane Function (UPF), as will be described in greater depth below with respect to FIG. 2.

Returning to the discussion of FIG. 1B, as illustrated the control plane entity SGW-C 118 can interface with user data plane entity SGW-U 120, and control plane entity PGW-C 124 can interface with user data plane entity PGW-U 126, in both cases via one or more respective interfaces. For example, the respective interfaces can be implemented based on 3GPP standards. In some cases, as provided by 3GPP standards, MME 112 can interface with SGW-C 118 via an S11 interface and SGW-C 118 can interface with PGW-C 124 via an S5/S8 interface (e.g., an S5/S8 interface for control plane 110 traffic exchanged between the control plane entities). In some examples, the S8 interface may be used when a UE (e.g., UE 102) is roaming between different operators. The S5 interface is a network internal interface for a given network operator. Control plane traffic can be exchanged between eNodeB 162a and MME 112 via the S1-MME interface. Data plane traffic can be exchanged between eNodeB 162a and SGW-U 120 via the S1-U interface (e.g., also referred to herein as S1U). SGW-U 120 and PGW-U 126 can interface via an S5U/S8U interface for data plane 130 traffic exchanged between the data plane entities. PCRF 116 can interface with SGW-C 118 via a Gxc interface and can interface with PGW-C 124 via a Gx interface.

In some examples, if an SGW and a PGW are deployed in a control and user plane split architecture as shown in FIGS. 1A-1B, then a PGW-C (e.g., PGW-C 124) can be configured to subscribe to User Location Information (ULI) change notifications with the MME 112. In some aspects, the ULI or User Location Information can refer to a ULI Information Element (IE) as defined in 3GPP TS 29.274, Section 8.21, which the MME 112 can assemble based on location related information received or tracked for a given UE. The MME 112 can communicate the ULI IE to other core network elements using various messages, as will be described in greater depth below. In some aspects, the term "ULI" can refer generally to ULI related location information that can be used in a ULI IE. According to TS 29.274, Section 8.21, location information that can be used in a ULI IE can include Cell Global Identifier (CGI), ECGI, Service Area Identifier (SAI), Tracking Area Identifier (TAI), Routing Area Identifier (RAI) and Location Area Identifier (LAI).

In some examples, based at least in part on the Radio Access Technology (RAT) type (e.g., 3G, 4G, 5G, etc.) being used, the MME 112 can receive, obtain, or otherwise determine one or more updates, changes, modifications, etc., for ULI related location information and/or other subscriber information. In such scenarios, upon every ULI change (e.g., upon every update or modification to ULI), the SGW-C 118 and/or the PGW-C 124 can be notified of the ULI change by the MME 112 through a Modify Bearer Request or Change Notification Request.

Figure 2:
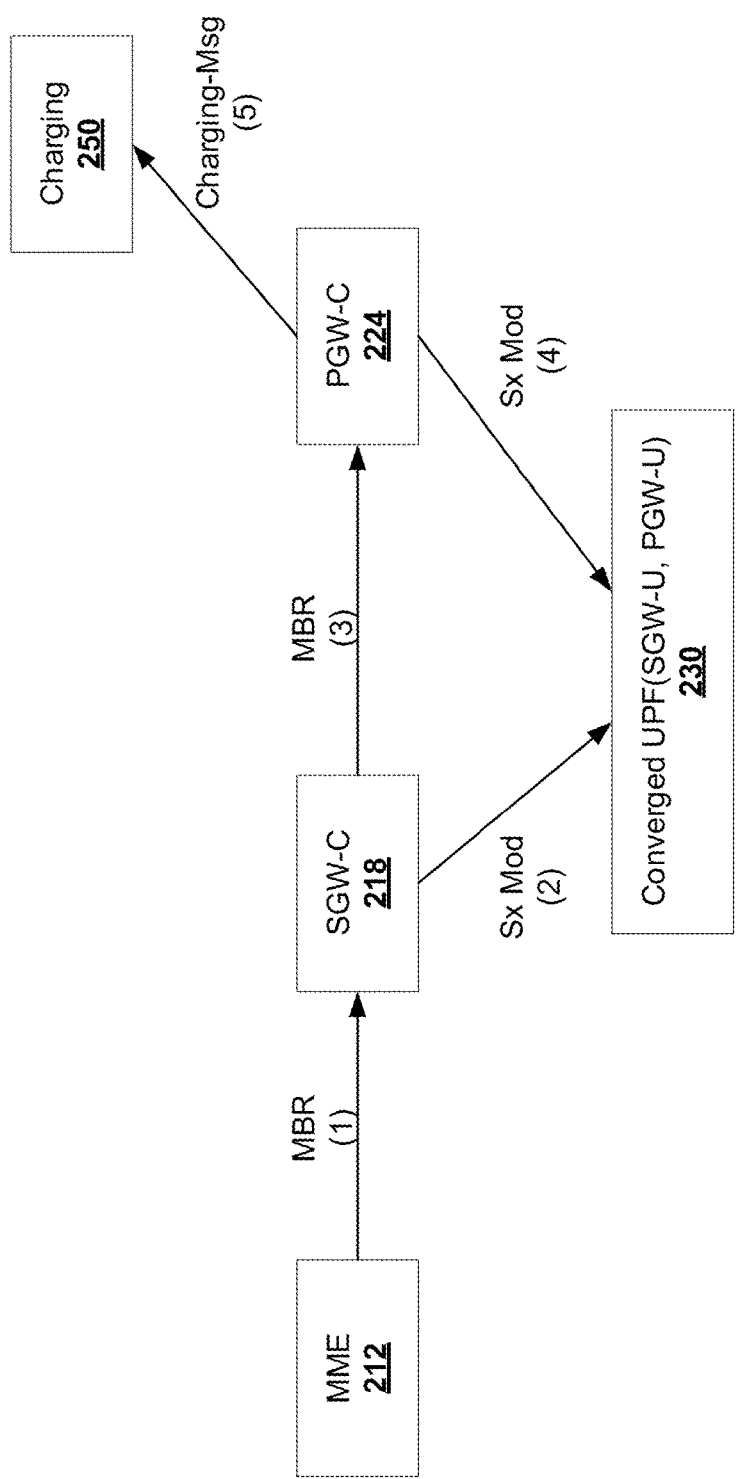
FIG. 2 illustrates an example diagram of an example flow for updating a Packet Data Network (PDN) Gateway User Plane (PGW-U) session with location or subscriber information.

FIG. 2 is a diagram illustrating an example flow 200 for updating the PGW-U with the most recent ULI, UE time zone (TZ) information, and/or other subscriber information. Depicted is an MME 212, SGW-C 218, PGW-C 224, Converged User Plane Function (UPF) 230, and charging function 250. In some embodiments, MME 212 can be the same as or similar to MME 112; SGW-C 218 can be the same as or similar to SGW-C 118; and/or PGW-C 224 can be the same as or similar to PGW-C 124.

The converged UPF 230 can include a pair of SGW-U and PGW-U sessions that have been collapsed (e.g., converged) on the user plane into a single user plane session. In one illustrative example, the SGW-U and PGW-U can be collapsed into the converged UPF 230 for sessions that support Collapsed Call on User Plane. The use of converged UPF 230 in place of using separate SGW-U and PGW-U sessions can be seen to provide signaling optimization(s) on the user plane, as messages/signaling that is exchanged between the control plane and the user plane can be directed to and from a single entity (e.g., the UPF) rather than discrete SGW-U and PGW-U sessions.

However, signaling optimization associated with converged UPF 230 and/or the use of Collapsed Call on User Plane does not extend to the control plane, which can be seen to implement a discrete SGW-C 218 and PGW-C 224. In some aspects, the 3GPP standard provides mechanisms for the propagation of ULI and/or subscriber information between the control plane and the user plane based on an assumption that both the control plane and the user plane implement discrete PGW and SGW sessions. As such, the use of the existing 3GPP specified approach to propagate updated ULI and/or subscriber information from the discrete control plane entities (e.g., SGW-C 218 and/or PGW-C 224) to the converged user plane entities (e.g., the SGW-U and PGW-U included in converged UPF 230) can cause inefficiencies, increased signaling overhead, and/or increased latency.

For example, the example flow 200 of FIG. 2 illustrates an example of the existing approach to propagating updated ULI and/or subscriber information, when applied in the context of a converged UPF 230. Updated ULI and/or subscriber information is determined or otherwise obtained on the control plane at MME 212. In some embodiments, MME 212 can then identify whether one or more control plane entities and/or user plane entities have requested to receive updated subscriber information or otherwise should receive updated subscriber information. For example, in the context of the present disclosure, location-based PGW-U services such as Event Data Record (EDR) or Traffic Optimization (TO) may request or otherwise require updated subscriber information in the course of providing their corresponding location-based service.

MME 212 then relays the updated ULI/subscriber information (also referred to collectively as "updated subscriber information") to the SGW-C 218. As illustrated, the updated subscriber information can be provided using a first Modify Bearer Request from MME 212 to SGW-C 218 (e.g., MBR (1)).

SGW-C 218 relays the updated subscriber information contained in MBR(1) to the PGW-C 224 and additionally may transmit a mandatory Sx Mod (2) message to the SGW-U Here, because the SGW-U is included in the converged UPF 230, SGW-C 218 is depicted as transmitting the mandatory Sx Mod message (e.g., Sx Mod (2)) to the converged UPF 230. In some aspects, the Sx Mod (2) message is a mandatory signaling message that is used to update the eNodeB Tunnel Endpoint Identifier (TEID) at the SGW-U, e.g., based at least in part on the fact that the Sx Mod message bridges (e.g., interfaces between) the control plane and the user plane (e.g., between SGW-C 218 and SGW-U included in UPF 230).

In addition to transmitting Sx Mod (2) with the eNodeB TEID, SGW-C 218 can additionally relay the updated subscriber information to PGW-C 224 using an additional MBR message, e.g., MBR (3), because the signaling between SGW-C and PGW-C remains fully within the control plane. In some aspects, in the context of Collapsed Call on User Plane and/or a converged UPF such as converged UPF 230, the additional message MBR (3) can be seen as signaling overhead that is used to update subscriber information to PGW-C 224, as will be described in greater depth below. For example, in some cases PGW-C 224 may not make use of the updated subscriber information or ULI itself, and instead, PGW-C 224 may be configured to simply relay the updated subscriber information/ULI received in MBR (3) from the control plane to the corresponding user plane entity, e.g., PGW-U within the converged UPF 230.

As illustrated, PGW-C 224 can generate and transmit a message Sx Mod (4) to the PGW-U within converged UPF 230. Sx Mod (4) can contain the updated subscriber information/ULI that was originally obtained at MME 212, as PGW-U may implement a location-based function that relies on access to the most current or up-to-date ULI and other subscriber information. In some examples, Sx Mod (4) can be viewed as signaling overhead to update subscriber information for EDR and/or TO generation (e.g., in an example in which the PGW-U implements an EDR and/or TO location-based function).

To update this information from the control plane to the user plane (e.g., from PGW-C 224 to PGW-U of converged UPF 230), the 3GPP specification includes a mechanism that is based on enabling a charging function trigger on PGW-C 224. In particular, the charging trigger can be associated with the charging function 250, illustrated in FIG. 2 as receiving a Charging-Msg (5) from PGW-C 224. Here, the charging trigger can be enabled based on a query Usage Reporting Rule (URR), which is overhead on PGW-C 224 and additional signaling overhead traffic towards the charging function 250. In some examples, the Charging-Msg (5)

can comprise signaling overhead that is generated and transmitted between PGW-C 224 and charging function 250 for the sole purpose of enabling the subscriber information/ULI to be updated from PGW-C 224 to PGW-U within converged UPF 250.

Notably, based on the existing approach specified under 3GPP standards, the converged UPF 230 will receive two separate messages—the Sx Mod (2) message with the mandatory update to eNodeB TEID (e.g., transmitted by SGW-C 218) and the Sx Mod (4) message with the updated ULI/subscriber information that was originally propagated by MME 212 in the MBR (1) message (e.g., transmitted by PGW-C 224). In a scenario in which SGW-U and PGW-U are implemented separately on the user plane (e.g., not in a collapsed session or converged UPF such as converged UPF 230), the separate Sx Mod (2) and Sx Mod (4) messages may be needed, based on the discrete SGW-U and PGW-U generally not communicating directly with one another.

However, this assumption does not hold when a converged UPF (e.g., converged UPF 230) or collapsed call on user plane session is implemented to combine the SGW-U and PGW-U on the user plane. Accordingly, it is contemplated herein that systems and techniques can be provided for optimized signaling of updated subscriber information and/or ULI from the control plane to a converged or collapsed UPF on the user plane, as will be described in greater depth below.

Figure 3:
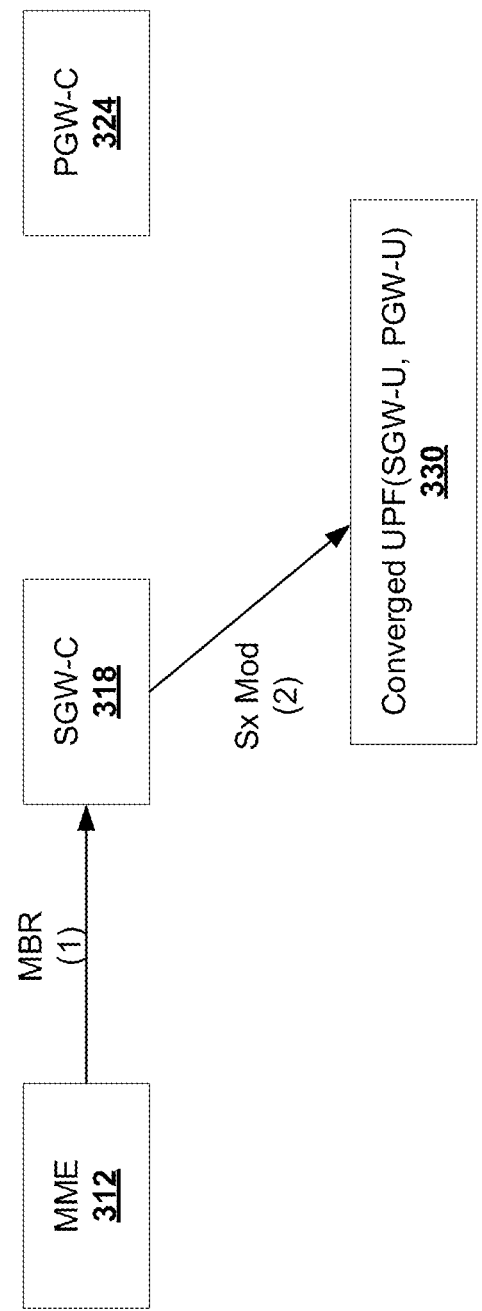
FIG. 3 illustrates an example diagram of an example improved flow for updating a Packet Data Network (PDN) Gateway User Plane (PGW-U) session with location or subscriber information, in accordance with some embodiments of the present disclosure.

FIG. 3 is a diagram illustrating an example flow 300 for updating a PGW-U with updated or most recent ULI and/or other subscriber information. Based on detecting or identifying the presence of a converged UPF (e.g., the converged UPF 330) on the user plane, the example flow reduces signaling overhead and latency involved in propagating the updated ULI/subscriber information to a PGW-U location-based service (e.g., EDR, TO, etc.). In particular, the systems and techniques described herein can be utilized ensure that the PGW-U within converged UPF 330 maintains the latest ULI or subscriber information based on piggybacking updates to the ULI/subscriber information on existing messages that are exchanged between SGW-C 318 and the SGW-U within converged UPF 330. By piggybacking the updated subscriber information on the existing signaling between SGW-C and SGW-U, the systems and techniques described herein can be used to eliminate the redundant signaling overhead/messages that would otherwise be exchanged with the PGW-C 224 and charging function 250 illustrated in FIG. 2 and described above.

In one illustrative example, the signaling overhead comprising MBR (3), Sx Mod (4), and Charging-Msg (5) (e.g., each as depicted in FIG. 2 and described above) can be eliminated according to aspects of the present disclosure. In addition to eliminating the signaling overhead associated with these three messages, the systems and techniques described herein can further avoid the message processing delay (e.g., latency) that would otherwise result as a consequence of generating and receiving each of these same three messages.

In some embodiments, the optimized signaling of updated ULI and/or updated subscriber information can be used in combination with (e.g., triggered or enabled based on) collapsing SGW-U and PGW-U sessions on the User Plane. In some embodiments, the SGW-U and PGW-U sessions are collapsed for sessions that support Collapsed Call on User Plane, as mentioned previously. In the example of the optimized call flow 300 depicted in FIG. 3, the collapsed SGW-U and PGW-U sessions are represented as the Converged UPF(SGW-U, PGW-U) session 330. As was also mentioned previously, the converged UPF 330 (e.g., collapsing of SGW-U and PGW-U sessions) can be implemented to achieve some degree of User Plane optimization. Aspects of the present disclosure are directed to providing further optimizations, now on the Control Plane.

For example, the aforementioned problem of increased signaling overhead can be addressed by ensuring that the PGW-U is able to maintain the latest subscriber information (e.g., ULI) by piggybacking the latest subscriber information on top of existing messages that are already exchanged between SGW-C and SGW-U. In other words, the messages "MBR(3)", "Sx Mod(4)", and "Charging-Msg(5)" that are utilized in the existing approach depicted in the call flow 200 of FIG. 2 can be eliminated. These three extra messages are used in existing approaches to update information to the User Plane for EDR, TO, and other PGW-U location-based services and use cases.

In one illustrative example, the updated ULI/subscriber information that previously required the generation and transmission (e.g., signaling) of these three extra messages in order to propagate to the PGW-U within converged UPF 230/330 can instead be piggybacked on top of the "Sx Mod(2)" message transmitted from the SGW-C 318 to the PGW-U (e.g., in the converged UPF 330). For, example, Sx Mod(2) can be used to propagate User Location Information (ULI) and/or UE Time Zone (TZ) information from SGW-C 218 to the PGW-U of converged UPF 330, based on piggybacking the ULI, UE TZ, and/or other updated subscriber information on top of the mandatory update to the eNodeB TED that must already be carried on Sx Mod (2). Notably, because the converged UPF 330 receives the Sx Mod (2) message (e.g., based on converged UPF 330 including the SGW-U and Sx Mod (2) being addressed to the SGW-U), the updated ULI/subscriber information piggybacked on the Sx Mod (2) message can be routed to the PGW-U within converged UPF 330, while the mandatory updated to the eNodeB TEID is still passed to the SGW-U within converged UPF 330, as before.

In some embodiments, the information previously carried by the three extra messages can be implemented directly in the UPF, by copying the location information (e.g., ULI, TZ, etc.) from SGW-U to PGW-U. The PGW-U in the converged UPF can then use the copied location information to implement EDR, TO, and/or any other location dependent features provided at or by the PGW-U. In some aspects, the standard for a converged UPF (e.g., such as converged UPF 330) states that the SGW-U and PGW-U should work independently. As such, it is further contemplated that, in some embodiments, the SGW-U within converged UPF 330 can transmit a return indication to SGW-C 318 (e.g., a return message or signal from SGW-U to SGW-C 318) indicating whether or not the session is collapsed (e.g., whether or not a converged UPF exists). Based on receiving an indication that the session is collapsed, SGW-C 318 can determine that the updated location/subscriber information (e.g., ULI, TZ information, etc.) can be shared in the converged UPF 330 (e.g., copied from the SGW-U to the PGW-U). In some embodiments, based on receiving an indication that the session is collapsed, SGW-C 318 can terminate the call flow before generating and/or transmitting the message MBR (3) that the 3GPP standard would otherwise dictate that SGW-C 318 transmit to PGW-C 324 in order to propagate the updated ULI/subscriber info to PGW-U (e.g., as described above with respect to the call flow 200 of FIG. 2 and the additional messages MBR(3), Sx Mod (4), and Charging-Msg (5)).

Based on this determination, SGW-C 318 can transmit any updated ULI/subscriber information (e.g., received at SGW-C 318 in the MBR (1) message transmitted by MME 312) only to SGW-U within the converged UPF 330. For example, SGW-C 318 can transmit only the "Sx Mod(2)" message, for example over the SXa interface, while omitting the messages (3)-(5) used in the existing approach depicted in FIG. 2 and described above. In some embodiments, if SGW-C 318 does not receive an indication that the session is collapsed, SGW-C 318 can fallback to performing existing approach specified according to the 3GPP standard (e.g., by sending message MBR (3) to PGW-C 324, which then transmits Sx Mod (4) to PGW-U within converged UPF 330 and Charging-Msg (5) to the charging function (e.g., charging function 250 depicted in FIG. 2).

These systems and techniques described herein can be used to optimize control plane signaling between SGW-C 318 and PGW-C 324 by eliminating signaling messages that would otherwise be exchanged or transmitted by these two control plane entities. Notably, as illustrated in FIG. 3, the systems and techniques described herein can be used to propagate updated ULI and/or subscriber information from the control plane to the user plane (e.g., to PGW-U of converged UPF 330) without requiring the involvement of PGW-C 324 in the optimized call flow 300. As such, signaling overhead, messaging processing delays, and/or overall latency can be reduced based on the elimination of the extra messages (3)-(5) seen in the existing approach described above with respect to call flow 200 of FIG. 2, and moreover, message processing delay can also be avoided in order to more quickly and efficiently provide updated ULI/subscriber information to a PGW-U location-based service within converged UPF 330.

In some aspects, the reduced signaling associated with the systems and techniques described herein can result in saving resources at a gateway node, and moreover, can reduce the number of hops required for message processing (e.g., thereby decreasing latency), both of which can contribute to improving one or more KPIs (key performance indicators) associated with the network and/or can contribute to improving user experience. In some embodiments, the systems and techniques described herein can be applied in the context of a 5G wireless network and/or updated ULI, location information, subscriber information, etc., that corresponds to one or more 5G subscribers. For example, the signaling optimization approach described herein can be used to reduce signaling overhead and latency for 5G subscribers connecting from EUTRAN to SGW-C and a Session Management Function (SMF).

As mentioned previously, the systems and techniques described herein can be used to propagate updated ULI and/or subscriber information from an MME or other control plane entity to a PGW-U location-based service. PGW-U location-based services can include EDR and/or TO, as also mentioned previously. More generally, PGW-U location-based services may need (or otherwise benefit from) receiving updated or most up-to-date ULI/subscriber information for one or more of the use cases described below. For example, location information may need to be made available on the PGW-U in order to implement (1) ULI-based charging triggers, charging differentiation, etc.; (2) ULI-based policy triggers, policy differentiation, etc.; (3) Lawful intercept for reporting on a subscriber's latest known location; (4) EDR generating for analytics, charging reconciliation, etc.; (5) TO for traffic optimization based on detection of elephant flows, congested RAN cells, etc.

In some examples, the most common use cases for updated ULI, location, subscriber, etc., information at PGW-U are the final two use cases listed above, e.g., EDR for generating for analytics, charging reconciliation, etc. and TO for traffic optimization based on detection of elephant flows, congested RAN cells, etc. In some examples, a wireless network operator may implement only these final two EDR and TO use cases, in terms of utilization of ULI/location/subscriber information at PGW-U. Notably, the existing signaling path is highly inefficient for both of these two uses cases, and may be significantly improved by use of the systems and techniques for signaling optimization as contemplated herein.

In some embodiments, the systems and techniques can selectively enable the MBR (3) message from SGW-C 318 to PGW-C 324. For example, MBR (3) might be selectively enabled in scenarios in which location information is needed at PGW-C 324 and/or a Session Management Function (SMF) (not shown).

Similarly, in some examples Sx Mod (4) can be selectively enabled from PGW-C 324 to PGW-U of converged UPF 330. For example, if the charging trigger is enabled and the particular deployment requires ULI-based charging differentiation, Sx Mod (4) can be selectively enabled such that the necessary information is sent from PGW-C 324 to PGW-U of converged UPF 330.

Figure 4:
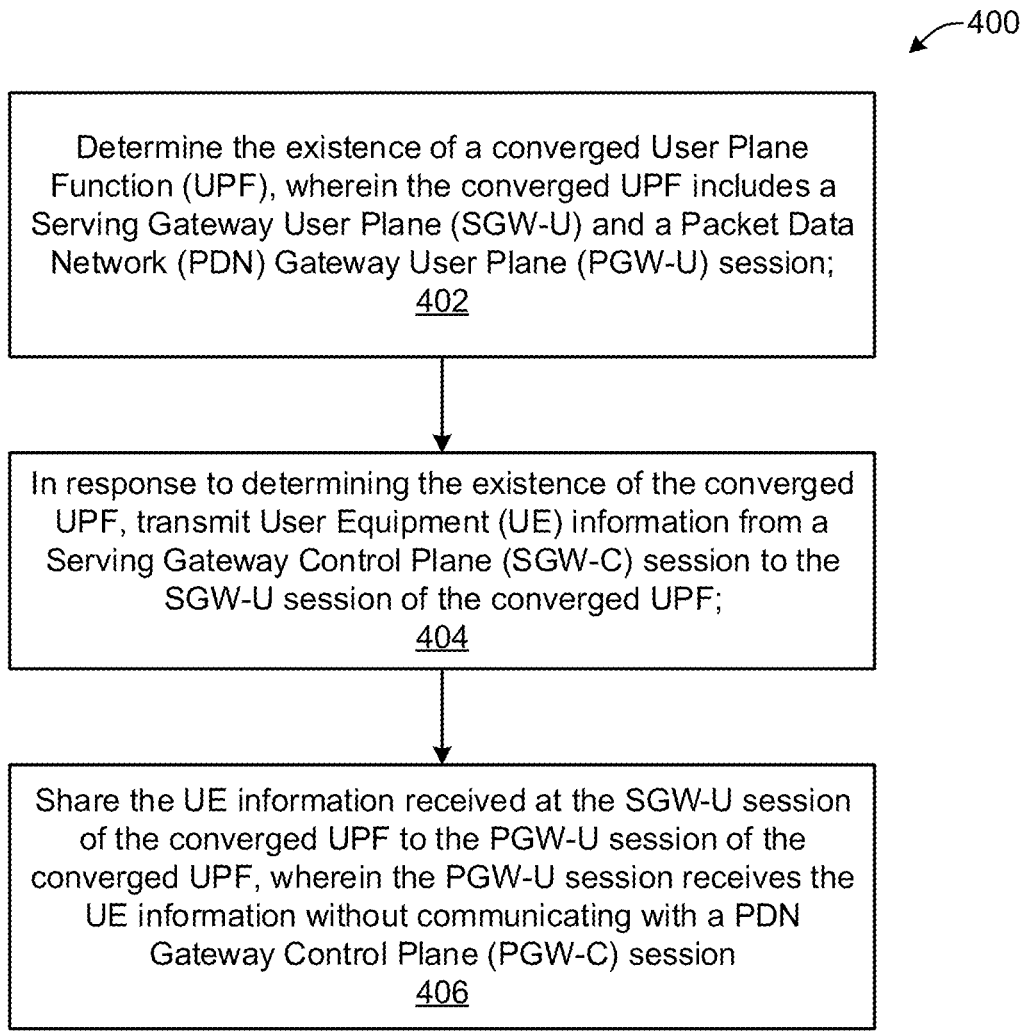
FIG. 4 illustrates a flowchart of an example method for improved signaling of subscriber information and updates thereto for one or more location-based user plane services, in accordance with some embodiments of the present disclosure.

FIG. 4 illustrates a flowchart of an example method 400 for improved signaling of subscriber information and updates thereto for one or more location-based user plane services, according to some aspects of the present disclosure. It is understood that example method 400 of FIG. 4 can also be implemented using one or more processors and memories having computer-readable instructions stored thereon, which when executed by the one or more processors cause the one or more processors to perform operations including some or all of the steps of example method 400. Although example method 400 depicts a particular sequence of operations, the sequence may be altered without departing from the scope of the present disclosure. For example, some of the operations depicted may be performed in parallel or in a different sequence that does not materially affect the function of example method 400. In other examples, different components of an example device or system that implements example method 400 may perform functions at substantially the same time or in a specific sequence.

According to some embodiments, at step 402 the method 400 includes determining the existence of a converged User Plane Function (UPF), wherein the converged UPF includes a Serving Gateway User Plane (SGW-U) session and a Packet Data Network (PDN) Gateway User Plane (PGW-U) session. For example, the converged UPF can be the same as or similar to one or more of the converged UPFs 230 and 330, illustrated in FIGS. 2 and 3 respectively. Similarly, the SGW-U can be the same as or similar to one or more of the SGW-Us illustrated in FIG. 1A as being included in the data plane 130, the SGW-U 120 illustrated in FIG. 1B, the SGW-U illustrated in FIG. 2 as being included in the converged UPF 230, and/or the SGW-U illustrated in FIG. 3 as being included in the converged UPF 330. Likewise, the PGW-U can be the same as or similar to one or more of the PGW-Us illustrated in FIG. 1A as being included in the data plane 130, the PGW-U 126 illustrated in FIG. 1B, the PGW-U illustrated in FIG. 2 as being included in the converged UPF 230, and/or the PGW-U illustrated in FIG. 3 as being included in the converged UPF 330.

In some embodiments, determining the existence of the converged UPF can be based on determining the existence of or otherwise identifying a Collapsed Call on User Plane session, wherein the Collapsed Call on User Plane session includes the SGW-U session and the PGW-U session. In some aspects, the collapsed user plane session and the converged UPF are the same. In some examples, determining the existence of the converged UPF is based on receiving, at an SGW-C, a message indicating that the SGW-U is included in a collapsed user plane session. For instance, the SGW-C 218 illustrated in FIG. 2 and/or the SGW-C 318 illustrated in FIG. 3 can receive a message indicating that the SGW-U is included in a collapsed user plane session (e.g., the converged UPF 230 or 330, respectively). In some cases, the message can be a response or reply message transmitted by the SGW-U of the converged UPF in response to receiving an Sx Mod message from the SGW-C. For example, the message can be a response or reply message transmitted by the SGW-U of the converged UPF in response to receiving the Sx Mod (2) message illustrated in FIG. 3 as being transmitted from the SGW-C 318 to the SGW-U of the converged UPF 330.

At step 404, the method 400 includes transmitting, in response to determining the existence of the converged UPF, User Equipment (UE) information from a Serving Gateway Control Plane (SGW-C) session to the SGW-U session of the converged UPF. For example, the SGW-C can be the same as or similar to one or more of the SGW-C 118 illustrated in FIGS. 1A and 1B, the SGW-C 218 illustrated in FIG. 2, and/or the SGW-C 318 illustrated in FIG. 3. In some examples, the UE information can include one or more of User Location Information (ULI), UE Time Zone (TZ) information, subscriber information, etc.

Additionally or alternatively, the UE information can include an update to existing ULI, UE TZ, and/or subscriber information, etc. For example, the UE information can be obtained by a Mobility Management Engine (MME) on the control plane. In some aspects, the UE information can be transmitted from the MME to the SGW-C, for example using a Modify Bearer Request (MBR) message. In some aspects, the MBR message can be the same as or similar to the MBR (1) message illustrated in FIGS. 3 and 3.

At step 406, the method 400 includes sharing the UE information received at the SGW-U session of the converged UPF to the PGW-U session of the converged UPF, wherein the PGW-U session receives the UE information without communicating with a PDN Gateway Control Plane (PGW-C) session. For example, the PGW-C session can be the same as or similar to one or more of the PGW-C 124 illustrated in FIGS. 1A and 1B, the PGW-C 224 illustrated in FIG. 2, and/or the PGW-C 324 illustrated in FIG. 3.

In some embodiments, the UE information received at the SGW-U session of the converged UPF session can be received in an Sx Mod message, such as the Sx Mod (2) message illustrated in FIGS. 2 and 3. In some aspects, the UE information can be piggybacked on top of mandatory update information for an eNodeB TEID that is transmitted in the Sx Mod (2) message. For example, an SGW-C can receive the UE information in an MBR message transmitted from an MME, such as the MBR (1) message transmitted from the MME 212, 312 illustrated in FIGS. 2 and 3, respectively. The UE information can be extracted from the MBR (1) message received at the SGW-C, and subsequently piggybacked onto the existing update to the eNodeB TEID that is transmitted in the Sx Mod/Sx Mod (2) message. The Sx Mod (2) message can be generated by the SGW-C 218, 318 (illustrated in FIGS. 2 and 3, respectively) and transmitted to the SGW-U of the converged UPF on the user plane (e.g., the converged UPF 230, 330 illustrated in FIGS. 2 and 3 respectively). The UE information can be shared or otherwise propagated from the SGW-C session, to the SGW-U session of the converged UPF, and then shared with the PGW-U session of the same converged UPF, without communicating with or otherwise involving the PGW-C (e.g., PGW-C 224, 324 illustrated in FIGS. 2, 3, respectively).

Figure 5:
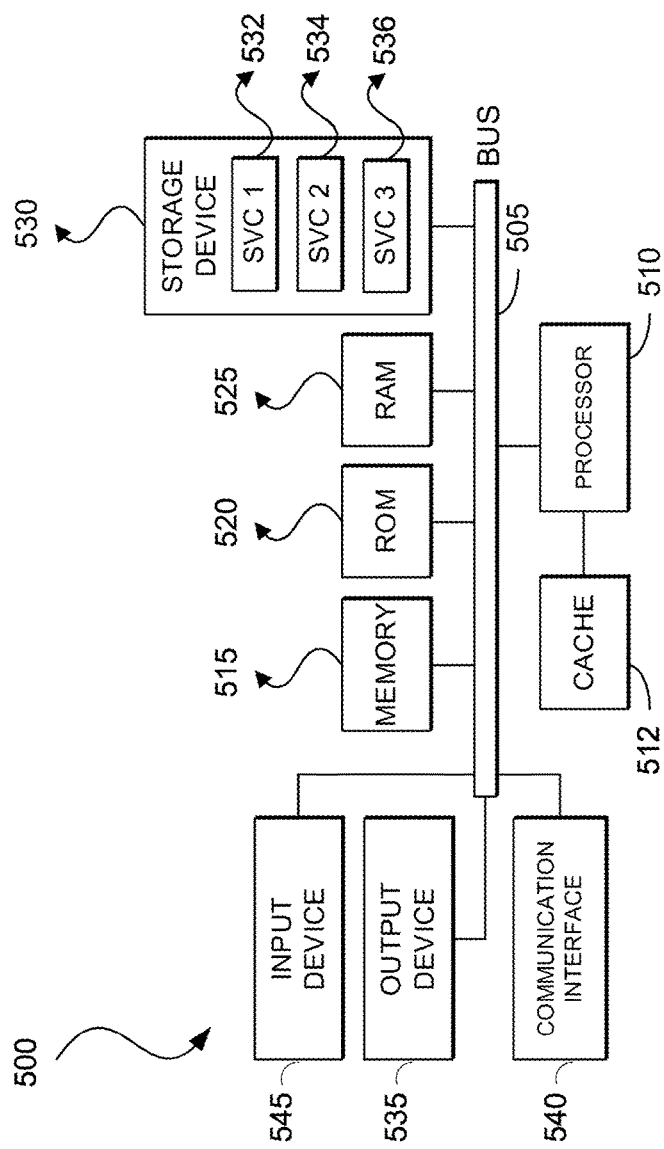
FIG. 5 illustrates an example system for implementing certain aspects of the present technology, in accordance with some embodiments of the present disclosure.

FIG. 5 illustrates a computing system architecture, according to some aspects of the present disclosure. Components of computing system architecture 500 are in electrical communication with each other using a connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   determining the existence of a converged User Plane Function (UPF), wherein the converged UPF includes a Serving Gateway User Plane (SGW-U) session and a Packet Data Network (PDN) Gateway User Plane (PGW-U) session; and
   in response to determining the existence of the converged UPF:
      transmitting User Equipment (UE) information from a Serving Gateway Control Plane (SGW-C) session to the SGW-U session of the converged UPF; and
      sharing the UE information received at the SGW-U session of the converged UPF to the PGW-U session of the converged UPF, wherein the PGW-U session receives the UE information without communicating with a PDN Gateway Control Plane (PGW-C) session.

2. The method of claim 1, wherein determining the existence of the converged UPF comprises determining the existence of a Collapsed Call on User Plane session, wherein the Collapsed Call on User Plane session includes the SGW-U session and the PGW-U session.

3. The method of claim 2, wherein the collapsed user plane session and the converged UPF are the same.

4. The method of claim 1, wherein determining the existence of the converged UPF is based on receiving, at the SGW-C, a message indicating that the SGW-U is included in a collapsed user plane session.

5. The method of claim 4, wherein the message indicating that the SGW-U is included in the collapsed user plane session is transmitted by the SGW-U in response to receiving an Sx Mod message from the SGW-C.

6. The method of claim 5, wherein:
   the Sx Mod message includes an updated eNodeB Tunnel Endpoint Identifier (TEID); and
   the Sx Mod message includes the UE information, wherein the UE information is piggybacked on the updated eNodeB TED.

7. The method of claim 1, wherein sharing the UE information to the PGW-U comprises providing the UE information received at the SGW-U session of the converged UPF to one or more PGW-U location-based services.

8. The method of claim 7, wherein the one or more PGW-U location-based services include an Event Data Record (EDR) service or a Traffic Optimization (TO) service.

9. The method of claim 1, wherein the UE information includes one or more of User Location Information (ULI) and UE Time Zone (TZ) information.

10. The method of claim 1, wherein the UE information includes an update to a User Location Information (ULI) associated with a given subscriber or an updated to a UE Time Zone (TZ) information associated with the given subscriber.

11. A system comprising:
    one or more processors; and
    at least one computer-readable storage medium having instructions stored thereon, wherein the instructions, when executed by the one or more processors, are effective to cause the one or more processors to:
        determine the existence of a converged User Plane Function (UPF), wherein the converged UPF includes a Serving Gateway User Plane (SGW-U) session and a Packet Data Network (PDN) Gateway User Plane (PGW-U) session; and
        in response to determining the existence of the converged UPF:

transmit User Equipment (UE) information from a Serving Gateway Control Plane (SGW-C) session to the SGW-U session of the converged UPF; and share the UE information received at the SGW-U session of the converged UPF to the PGW-U session of the converged UPF, wherein the PGW-U session receives the UE information without communicating with a PDN Gateway Control Plane (PGW-C) session.

12. The system of claim 11, wherein to determine the existence of the converged UPF, the instructions cause the one or more processors to determine the existence of a Collapsed Call on User Plane session, wherein the Collapsed Call on User Plane session includes the SGW-U session and the PGW-U session.

13. The system of claim 12, wherein the collapsed user plane session and the converged UPF are the same.

14. The system of claim 11, wherein the instructions cause the one or more processors to determine the existence of the converged UPF based on receiving, at the SGW-C, a message indicating that the SGW-U is included in a collapsed user plane session.

15. The system of claim 14, wherein the message indicating that the SGW-U is included in the collapsed user plane session is transmitted by the SGW-U in response to receiving an Sx Mod message from the SGW-C.

16. The system of claim 15, wherein:
the Sx Mod message includes an updated eNodeB Tunnel Endpoint Identifier (TEID); and
the Sx Mod message includes the UE information, wherein the UE information is piggybacked on the updated eNodeB TED.

17. The system of claim 11, wherein to share the UE information to the PGW-U, the instructions cause the one or more processors to provide the UE information received at the SGW-U session of the converged UPF to one or more PGW-U location-based services.

18. The system of claim 7, wherein the one or more PGW-U location-based services include an Event Data Record (EDR) service or a Traffic Optimization (TO) service.

19. The system of claim 11, wherein the UE information includes one or more of User Location Information (ULI) and UE Time Zone (TZ) information.

20. The system of claim 11, wherein the UE information includes an update to a User Location Information (ULI) associated with a given subscriber or an updated to a UE Time Zone (TZ) information associated with the given subscriber.

* * * * *